United States Patent Office 2,867,615
Patented Jan. 6, 1959

2,867,615

PREPARATION OF GLYOXALATED COMPOUNDS OF STARCH

René Léon Lehmann and Louis Gandon, Paris, France, assignors to Bozel-Maletra, Société Industrielle de Produits Chimiques, Paris, France, a corporation of France No Drawing. Application December 28, 1955
Serial No. 556,019

Claims priority, application France October 19, 1955

10 Claims. (Cl. 260—233.3)

The present invention relates to a method of preparation of glyoxalated compounds of starch.

Efforts have been made for a long time to produce industrially stable adhesives made from starch which can be preserved in the form of dispersions in water but which, when the water is evaporated, that is to say at the moment of drying, remain capable of giving a film which is practically insoluble in water. The attempts which have been made to satisfy these two requirements, which have, up to the present time, appeared contradictory, have not led to the development of any simple and practical methods of manufacture.

Thus, in particular, it has been proposed to condense derivatives of starch soluble in water with formaldehyde, in the presence of a catalyst, so as to form a product which is still soluble in water, and to add free aldehyde, or permit some to remain in the reaction product. This known method is very complicated in practice; it comprises a preliminary condensation in an autoclave, of the starch which has been previously rendered soluble, followed by an addition of formol. In these conditions, there are obtained products which become resistant to water after drying at 80 to 100° C.

The present invention relates to a simple and practical method of obtaining starch adhesives which are stable and therefore can be preserved in the form of dispersions in water, but which, when the water is evaporated, that is to say at the moment of drying, give a film which is practically insoluble in water.

It has been found, and this observation constitutes the basis of the present invention, that the reaction of the glyoxal on a starchy material forms, in the presence of water, a molecular aggregate which is insoluble in water. This result was quite unexpected and could not be foreseen. In fact, if the operation is carried out in the same conditions with the mono-aldehydes, for example by causing a natural starch to react with formaldehyde for example, there is not produced at any moment a product which is insoluble in water; it is merely found that, at the moment of the bursting of the grain of starch at 65–75° C., an ordinary starch paste is formed, like that which would be produced in the presence of water alone, but the formaldehyde does not have any specific effect and the adhesives thus obtained never give films which are resistant to water.

It would appear that the very special behaviour of the glyoxal can be explained as follows: the glyoxal acts on the molecules of starch as a bridge-forming agent, which results, at the moment of the bursting of the grain of starch in an insoluble aggregate formed by reticulate molecules (this aggregate will be termed in the text following "starch-glyoxal gel"). By continuing the heating process, this starch-glyoxal gel is converted into adhesive, since the molecules become shorter and in consequence are dispersable in water.

During the concentration of the adhesives by the evaporation of water, the reticulation of the molecules continues and becomes more and more intense; thus, the final result is that the molecules are very reticulated and are practically insoluble in water.

Taking account of the above observations, the method in accordance with the present invention is thus essentially characterised in that a starchy material of any kind, natural or rendered soluble, is caused to react in an aqueous medium with glyoxal or one of its homologues, until a starch-glyoxal gel is obtained which is insoluble in water, and which is then heated so as to obtain an adhesive.

The said adhesive may be used directly without the addition of aldehyde or of a catalyst, and gives by simple drying, even at ordinary temperatures, a film which is practically insoluble in water and which has an exceptional hardness.

In the preferred form of embodiment, the method in accordance with the invention is characterised in that the starchy material is first mixed with glyoxal and water, to which mixture a catalyst is added if so required, in order to maintain the reaction medium acid or in some cases neutral but not alkaline, and then heating to a moderate temperature, comprised for example between 50 and 75° C., thus forming a molecular aggregate which is insoluble in water, this aggregate being stirred and finally heated to a higher temperature, for example to 95 to 100° C., if necessary in the presence of an additional quantity of water, at least until the liquefaction of the starch-glyoxal gel takes place.

When a homogeneous liquid has been obtained (liquefaction of the gel) and the heating is stopped, it is found that an adhesive has been produced which is directly usable either hot or cold; when it is allowed to cool, the adhesive sets in a mass in the form of a consistent, stable and invariable jelly, which is readily dispersable in an aqueous medium, even in the cold state.

When the heating is carried beyond the stage of simple liquefaction of the gel, a fairly liquid adhesive can be obtained which cannot be jellified by cooling at the ordinary temperature. It will thus be seen that according to whether the reaction is carried more or less far, it is possible to obtain adhesives having variable physical properties which can be adapted to suit each of a number of particular uses, all these adhesives giving, however, when dried, even at ordinary temperatures, films having a high resistance to water. In order to carry the reaction to the desired stage, it is only necessary to neutralize the reaction medium by the addition of an alkaline, if this medium is acid.

As initial starchy products, native products may be used such as starches, starch-flour, etc., or partly hydrolysed starches as soluble starch, for example.

If it is assumed that starch may be represented by the following formula:

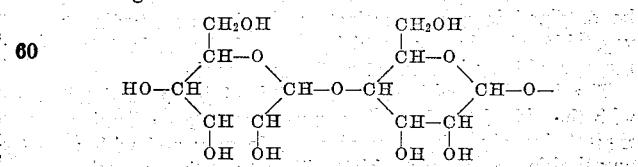

This formula can be written in the following diagrammatic form:

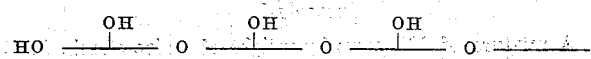

The method in accordance with the invention thus involves the following series of equations:

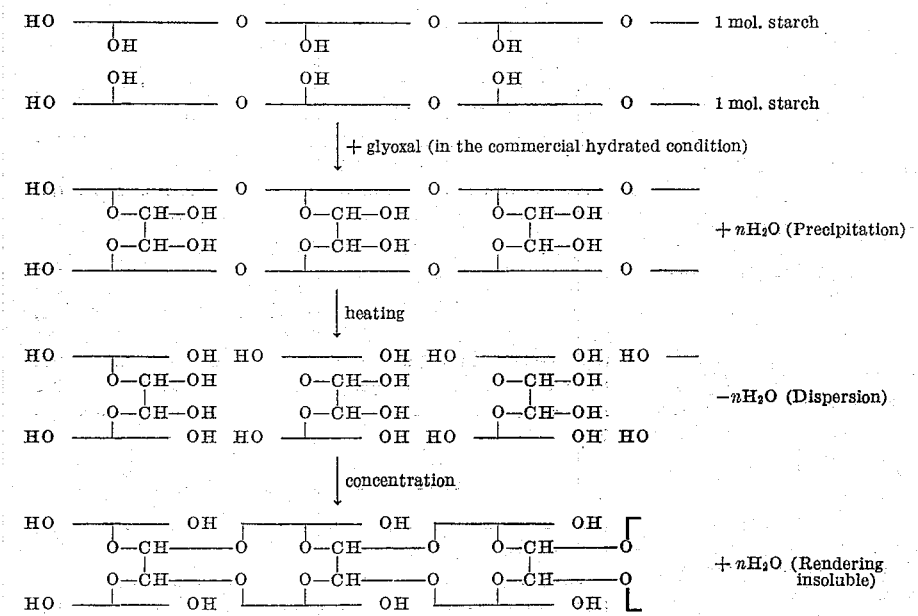

Due emphasis must be laid on the technical progress represented by the method in accordance with the invention, as well as on the great number of possibilities which it makes available through the products which can be prepared by its use. It was known that glyoxal has the property of giving with starchy materials, compounds which are practically insoluble in water, and it might have been hoped that this property would have a certain number of very useful applications, especially in the field of adhesives, sizing materials, fillers and coatings for papers and textile materials, washable water paints, colours for washable wall-papers. In practice, however, all attempts to apply this property have failed because of the various difficulties which arise. For example, when glyoxal is added to a vegetable adhesive, the effect of the glyoxal is so violent that an immediate coagulation is produced. It thus became necessary to use adhesives of starchy materials which had been more intensely degraded previously (for example by dextrination or during the course of other conversions such as etherification, esterification, etc.) or to apply the glyoxal by subsequent coating by means of a solution of this product, which represent serious practical complications. In addition, in the case of starchy materials which have been previously degraded as indicated above (by dextrination for example) the results of insolubilisation obtained with the glyoxal are often very inferior, and in order to obtain them, it is frequently necessary to operate in the presence of acid catalysts, and even generally to heat up to fairly high temperatures. Now, in the case of certain applications (for example paints) heating or the presence of acid catalysts cannot in general be contemplated.

The method which forms the object of the present invention, on the contrary removes all these difficulties by virtue of the preparation of stable adhesives which can be obtained in a manner just as simple as an ordinary vegetable adhesive and which have all the desired features sought for in vain up to the present time.

The invention will now be explained in more detail with the aid of the following examples of its application, these being given by way of example only and without any limiting sense, and which will show at the same time its practical possibilities and advantages:

*Example 1*

A mixture of 200 parts by weight of maize starch, 20 parts of glyoxal, 776 parts of water and 4 parts of pentachloro-phenate of sodium (to prevent fermentation) were heated whilst being thoroughly stirred at 65 to 70° C. until a starch-glyoxal gel was formed; the heating was then continued while stirring in the presence of an acid catalyst, for example 3 parts of oxalic acid, the temperature being raised to 95 to 100° C., this temperature being maintained, until the gel was liquified and an adhesive was produced which ran freely while hot but which remained jellifiable when cold. Under these conditions, the liquefaction of the gel requires about 1½ hours.

When it has cooled, the adhesive sets in a mass in the form of a consistent jelly.

The starchy binder thus obtained may be applied to a variety of uses: as a binder for washable water paints, for colours of washable wall-papers, for permanent textile fillers, for coatings of washable laid papers, etc.

By way of example, 1500 parts by weight of chalk whitening were moistened with 330 parts of water so as to obtain a homogeneous paste. To this chalk paste, there were introduced while stirring 1150 parts of the starch binder obtained as above and the stirring was continued until the mixture was completely homogeneous.

There was thus obtained an excellent water paint which can be stocked for unlimited periods without deterioration, and providing after application and drying, a washable film which is very hard, very adhesive, very resistant to rubbing and which does not powder.

*Example 2*

100 parts of ordinary potato starch, 20 parts of glyoxal, 300 parts of water and 3 parts of sulphuric acid acting as a catalyst were mixed in the cold state; the mixture was then heated whilst stirring thoroughly, to about 65° C. until there was formed a starch-glyoxal gel, after which the heating was continued while stirring, the temperature being raised to 95 to 100° C., this temperature being maintained up to the liquefaction of the gel and the production of an adhesive, a test sample of which does not jellify on cooling at ordinary temperatures; at this moment, the reaction is stopped by neutralising the reaction medium with caustic soda. The whole operation lasts for about 2 hours.

The binder thus obtained is liquid at ordinary temperatures and can be kept indefinitely; it provides transparent films which are fairly brilliant and resistant to water, these films being thus suitable for a large number of applications: cold gluing of paper, varnishing of papers and cardboards (playing cards, advertising signs, etc.) as a constituent of coatings for laid papers, for textile fillers, as a colour constituent for washable wall-papers, etc.

By way of example, a quantity of starch binder prepared as described above was introduced while thoroughly stirring into an ordinary colour for wall-papers comprising the usual pigments and fillers but having no binder, the quantity of binder added being such that the adhesive index (ratio of the weight of dry starch material to the total weight of dry material) is of the order of 12%. There was also added carboxy-methyl-cellulose in the proportion of 2% with respect to the starch binder referred to above, this addition being made with the object of improving the smooth running characteristics of the colour with a view to its application by machine.

There was obtained a very homogeneous colour which keeps indefinitely and which, after application on the paper and drying, gives a washable wall-paper without any variation in the usual process of manufacture.

What we claim is:

1. A method of preparing an adhesive jelly which by mere drying will form a film substantially insoluble in water, comprising the steps of preparing a mixture of starch, a compound of the group consisting of glyoxal and its homologues, and water, heating said mixture at a temperature below about 75° C. until a substantial amount of an insoluble compound is precipitated, and then continuing the heating of said mixture at a higher temperature above 75° C. but not exceeding 100° C., at least until said insoluble compound is dissolved.

2. A method as claimed in claim 1 further comprising the step of adding an acidic catalyst to said mixture before the heating so as to maintain the reaction mixture non-alkaline.

3. A method as claimed in claim 1, further comprising the step of adding oxalic acid to said mixture before the heating.

4. A method of preparing an adhesive jelly which by mere drying will form a film substantially insoluble in water, comprising the steps of preparing a dispersion of native starch in an aqueous glyoxal solution, heating, while stirring, said dispersion at a temperature between about 50° C. and 75° C. until a substantial amount of an insoluble gel is formed, and continuing the stirring while heating the material at a temperature between 95° C. and about 100° C., at least until said gel is re-dissolved.

5. A method of preparing an adhesive jelly which by mere drying will form a film substantially insoluble in water, comprising the steps of preparing a dispersion of native starch in an aqueous glyoxal solution, heating, while stirring, said dispersion at a temperature between about 50° C. and 75° C. until a substantial amount of a gel is precipitated, then adding a further quantity of water, then continuing the stirring while heating the material at a temperature between about 95° C. and about 100° C., at least until said gel is re-dissolved, and then cooling the resulting material to room temperature.

6. A method of preparing an adhesive jelly which when dried will form a film substantially insoluble in water, comprising the steps of preparing a mixture of native starch, water, glyoxal and a catalyst maintaining the mixture non-alkaline, heating, while stirring, said mixture at a temperature between about 50° C. and about 75° C. until a substantial amount of a gel is precipitated, then adding a further quantity of water, then continuing the stirring and heating of the material at a temperature between about 95° C. and about 100° C., at least until said gel is re-dissolved, and cooling the reaction material to room temperature.

7. A method as claimed in claim 6 wherein said catalyst is sulfuric acid.

8. A method of preparing an adhesive jelly which when dried will form a film substantially insoluble in water, comprising the steps of preparing a reaction mixture of native starch, water, glyoxal and sulfuric acid, heating with stirring said reaction mixture at a temperature between about 50° C. and about 75° C. until a substantial amount of an insoluble gel is formed, continuing, while stirring, the heating at a temperature between about 95° C. and about 100° C., at least until said gel is re-dissolved, then neutralizing the reaction material and cooling it to room temperature.

9. A stable starch adhesive giving, when dried, a film substantially insoluble in water, comprising the reaction product of heating, while stirring, a dispersion of starch in an aqueous solution of glyoxal, first at a temperature of at least 50° C. but below about 75° C. until a substantial amount of an insoluble compound is precipitated and secondly at a higher temperature higher than 75° C. but not exceeding about 100° C., at least until said insoluble compound is dissolved.

10. A native starch adhesive giving, when dried, a film substantially insoluble in water, comprising the reaction product of heating, while stirring, a dispersion of native starch in an aqueous solution of glyoxal, first at a temperature between about 50° C. and about 75° C. until a substantial amount of an insoluble compound is precipitated and secondly at a higher temperature between about 95° C. and about 100° C., at least until said insoluble compound is dissolved.

References Cited in the file of this patent

UNITED STATES PATENTS

| | | |
|---|---|---|
| 2,510,748 | Lolkema et al. | June 6, 1950 |
| 2,549,177 | Davidson | Apr. 17, 1951 |
| 2,698,936 | Staerkle et al. | Jan. 4, 1955 |